(12) United States Patent
Hu et al.

(10) Patent No.: US 11,021,179 B1
(45) Date of Patent: Jun. 1, 2021

(54) METHOD FOR DETECTING WHETHER POINT RAIL OF TURNOUT IS ATTACHED TO STOCK RAIL

(71) Applicant: EAST CHINA JIAOTONG UNIVERSITY, Nanchang (CN)

(72) Inventors: Jun Hu, Nanchang (CN); Mengfei Wu, Nanchang (CN); Kangyu Liang, Nanchang (CN); Yuqi Wei, Nanchang (CN); Hao Liu, Nanchang (CN); Junjie Yang, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 0 days.

(21) Appl. No.: 17/156,652

(22) Filed: Jan. 25, 2021

(30) Foreign Application Priority Data

Jan. 30, 2020 (CN) .......................... 202010077523.1

(51) Int. Cl.
| | | |
|---|---|---|
| *B61L 27/00* | (2006.01) | |
| *G01L 1/22* | (2006.01) | |
| *B61L 23/04* | (2006.01) | |
| *H04W 4/38* | (2018.01) | |
| *B61L 7/00* | (2006.01) | |

(52) U.S. Cl.
CPC .............. *B61L 27/0088* (2013.01); *B61L 7/00* (2013.01); *B61L 23/047* (2013.01); *B61L 27/0005* (2013.01); *G01L 1/22* (2013.01); *H04W 4/38* (2018.02); *B61L 2201/00* (2013.01); *B61L 2205/00* (2013.01)

(58) Field of Classification Search
CPC ...... B61L 27/0088; B61L 7/00; B61L 23/047; B61L 27/0005; B61L 2201/00; B61L 2205/00; H04W 4/38; G01L 1/22
See application file for complete search history.

(56) References Cited

U.S. PATENT DOCUMENTS 4,695,017 A * 9/1987 Ringer ...................... E01B 7/00
246/428
5,012,747 A * 5/1991 Burg ........................ E01B 25/12
104/130.05

(Continued)

FOREIGN PATENT DOCUMENTS

CN 201142249 Y 10/2008
CN 101537846 A 9/2009

(Continued)

*Primary Examiner* — Jason C Smith (57) ABSTRACT

A method for detecting whether a point rail is attached to a stock rail is disclosed. The method is performed by using a first pressure sensor and a second pressure sensor. Each of the first pressure sensor and the second pressure sensor is configured to detect whether the point rail is attached to the corresponding one of the pair of stock rails, convert a pressure signal between the point rail and the stock rails into a voltage signal, and transmit the voltage signal to a signal processor. The signal processor is configured to process and transmit the processed voltage signal to a monitoring center having a host computer. The host computer is configured to control an operation of a switch in response to the detected pressure value collected by the first pressure sensor and the second pressure sensor by using a PID control algorithm.

6 Claims, 5 Drawing Sheets

(56) References Cited

U.S. PATENT DOCUMENTS

| | | | | |
|---|---|---|---|---|
| 5,020,441 | A | * | 6/1991 | Burg ........................ E01B 25/12 |
| | | | | 104/130.05 |
| 5,417,392 | A | * | 5/1995 | Wyatt ........................ B61L 5/04 |
| | | | | 246/257 |
| 2007/0007394 | A1 | * | 1/2007 | Hein ........................ E01B 7/12 |
| | | | | 246/382 |
| 2007/0014532 | A1 | * | 1/2007 | Parisi ..................... A63H 19/32 |
| | | | | 386/343 |
| 2011/0064273 | A1 | * | 3/2011 | Zarembski ............... B61K 9/08 |
| | | | | 382/104 |
| 2015/0307118 | A1 | * | 10/2015 | Noffsinger ............... B60M 1/30 |
| | | | | 701/19 |
| 2019/0127921 | A1 | * | 5/2019 | Coats ........................ E01B 7/06 |

FOREIGN PATENT DOCUMENTS

| | | |
|---|---|---|
| CN | 201392257 Y | 1/2010 |
| CN | 104807583 A | 7/2015 |
| CN | 110057482 A | 7/2019 |
| CN | 209927329 U | 1/2020 |
| CN | 209945601 U | 1/2020 |

* cited by examiner

METHOD FOR DETECTING WHETHER POINT RAIL OF TURNOUT IS ATTACHED TO STOCK RAIL

CROSS REFERENCE TO RELATED APPLICATIONS

The present disclosure claims priority to Chinese Patent Application No. 202010077523.1 filed on Jan. 30, 2020, the contents of which is herein incorporated by reference in its entirety.

TECHNICAL FIELD

The present disclosure relates to the field of turnout detection, and in particular to a method for detecting whether a point rail of a turnout is attached to a stock rail of the turnout.

BACKGROUND

A point rail is moved under the action of a switch, to change a trajectory of a train. Once the point rail is not closely or tightly attached to a stock rail, wheelsets of the train will impact the point rail, thereby causing damage to the point rail, and even causing a derail of the train. Once foreign objects, such as gravel, ice, or the like, exist between the point rail and the stock rail, the point rail cannot be closely or tightly attached to the stock rail. In addition, in case an operating mechanism of the switch fails, it will also result in a failure in normal attachment of the point rail to the stock rail. Therefore, monitoring a relationship between the point rail and the stock rail can identify whether the point rail is closely attached to the stock rail.

In the related art, whether the point rail is closely attached to the stock rail is determined or judged based on or by using information fed back by the switch. In case that the switch fails, it is a risk that a console has received the information that the switching of position of the turnout is finished by the switch while the point rail fails to be closely attached to the stock rail, which may lead to misjudgment and serious losses. However, whether the operation of the turnout is in place is determined by the determination whether the point rail is closely attached to the stock rail, and it is difficult to guarantee that the point rail is closely attached to the stock rail only based on the feedback of the switch.

SUMMARY

In order to solve the above technical problems, an objective of the present disclosure may be to provide a method for detecting whether a point rail of a turnout is attached to a stock rail of the turnout, which determines whether the point rail is attached to the stock rail by sensing or detecting a pressure between the point rail and the stock rail by means of a strain gauge, and control an operation of the switch by using a PID (Proportional Integral Derivative) control algorithm, such that the switch can accurately control that the point rail is attached to the stock rail.

In order to achieve the above technical objective, the method for detecting whether a point rail of a turnout is attached to a stock rail of the turnout can be achieved by the following scheme.

A method for detecting whether a point rail of a turnout is attached to a stock rail of the turnout may be disclosed. The point rail corresponds to a pair of stock rails, and the pair of stock rails are disposed at two opposite side of the point rail; the method is performed by using a first pressure sensor and a second pressure sensor; the first pressure sensor and the second pressure sensor are identical to each other. Each of the first pressure sensor and the second pressure sensor is disposed on a corresponding one of the pair of stock rails, and each of the first pressure sensor and the second pressure sensor is configured to detect whether the point rail is attached to the corresponding one of the pair of stock rails, convert a pressure signal between the point rail and the corresponding one of the pair of stock rails into a voltage signal, and transmit the voltage signal to a signal processor; the signal processor is configured to process the voltage signal to acquire a detected pressure value and transmit the detected pressure value to a monitoring center of a relevant railway department; wherein a host computer is set at a PC (personal computer) side of the monitoring center, and the host computer is configured for a user to visually check whether point rail is attached to the stock rail, and configured to control an operation of a switch in response to the detected pressure value collected by the first pressure sensor and the second pressure sensor by using a PID (Proportional Integral Derivative) control algorithm, such that the switch drives the point rail to be attached to the corresponding one of the pair of stock rails.

The first pressure sensor and the second pressure sensor are disposed on the pair of stock rails at a mounting position of the stock rails, and a distance between the mounting position of the stock rails and an end of the point rail ranges from substantially 1.5 m to substantially 2.5 m. The first pressure sensor and the second pressure sensor are symmetrically disposed at two sides of the pair of stock rails facing towards each other, and each of the first pressure sensor and the second pressure sensor are disposed on the corresponding one of the pair of stock rails.

Each of the first pressure sensor and the second pressure sensor a spring, a first metal aluminum sheet, a second metal aluminum sheet, and a strain gauge; the spring is disposed between the first metal aluminum sheet and the second metal aluminum sheet, the strain gauge is disposed between the second metal aluminum sheet and the spring, and the second metal aluminum sheet is disposed at a bottom of each of the pair of stock rails; wherein when the switch drives the point rail to move toward the corresponding one of the pair of stock rails, the point rail applies a force to the first metal aluminum sheet, the first metal aluminum sheet transmits the force to the spring, and the spring applies another force to the strain gauge, causing a change in a resistance value of the strain gauge; the change in the resistance value of the strain gauge is converted into a change in a voltage value via the signal processor, processed by the signal processor, and further sent to the host computer at the PC side for display.

The signal processor comprises a metal aluminum box, a signal conditioning circuit board, an analog data collector, a control circuit board, a step-down converter, a Beidou positioning circuit, and a GPRS (General packet radio service) module; the signal conditioning circuit board, the analog data collector, the control circuit board, the step-down converter, the Beidou positioning circuit, and the GPRS communication circuit are arranged side by side in the metal aluminum box; the step-down converter is configured to step down a power of the switch and further supplies the stepped-down power to the signal conditioning circuit board, the analog data collector, the control circuit board, the Beidou positioning circuit, and the GPRS communication circuit; the signal conditioning circuit board is configured to convert the resistance value of the strain gauge into a voltage signal and transmit the voltage signal to the analog data collector; the analog data collector is configured to convert the voltage signal into a digital signal, and the digital signal is further transmitted to the control circuit board through a RS485 communication protocol; the Beidou positioning circuit is configured to send positioning information to the control circuit board; the control circuit board is configured to convert the voltage value into the detected pressure value to acquire a pressure between the point rail and the corresponding one of the pair of stock rails and further control the GPRS communication circuit to send the detected pressure value and the positioning information of the switch to the monitoring center of the relevant railway department, and whether the point rail is attached to the stock rail is checked via the host computer at the PC side of the monitoring center.

The PC in the monitoring center is configured to monitor the switch, data exchange interfaces are arranged between the host computer of the PC and a monitoring software of the switch, and the monitoring software of the switch is configured to control the rotation of the switch based on the detected pressure value in the host computer of the PC in the monitoring center to drive the point rail to be attached to the stock rail.

The method further comprises; initializing the system; driving, by the switch, the point rail to move towards the corresponding one of the pair of stock rails, such that the force applied to the strain gauge by the point rail gradually increases, and the resistance value of the strain gauge is changed; converting, by the signal conditioning circuit board, the changed resistance value of the strain gauge into the voltage value; converting, by the analog data collector, the voltage value into a digital value; sending the converted digital value to the control circuit board through the RS485 communication protocol to realize data collection; converting, by the control circuit board, the voltage value to the detected pressure value; transmitting the detected pressure value to the host computer at the PC side of the monitoring center for display; calculating, by the host computer at the PC side of the monitoring center, a deviation between a preset pressure value between the point rail and the stock rail corresponding to a state in which the point rail is attached to the stock rail and the detected pressure value fed back by the strain gauge by using the PID control algorithm; transmitting the calculated deviation to the monitoring software of the switch; controlling, by the monitoring software of the switch, the PC to send a rotation command to the switch according to the detected pressure value to drive the switch to continue to rotate, until the detected pressure value between the point rail and the stock rail reaches the preset pressure value; in response to the detected pressure value between the point rail and the stock rail reaching the preset pressure value, the switch stopping rotating, and determining that the point rail is attached to the stock rail.

Controlling the operation of the switch by using the PID control algorithm comprises: presetting the preset pressure value corresponding to the state in which the point rail is attached to the stock rail in the host computer at the PC side of the monitoring center; calculating the deviation between the detected pressure value fed back by the strain gauge and the preset pressure value; generating a control component based on the deviation through a linear combination of proportional, integral, and differential operations; controlling, by the PC, the switch in response to the control component until the deviation reaches 0; determining that the point rail is attached to the stock rail in response to the deviation reaching 0; and controlling, by the PC, the switch to stop operation such that the control of the switch is completed.

In the present disclosure, whether the point rail is attached to the stock rail is determined by sensing or detecting a pressure between the point rail and the stock rail by means of a strain gauge, and control an operation of the switch by using the PID control algorithm, such that the switch can accurately control that the point rail is attached to the stock rail. Thus, the present disclosure may achieve the following technical effects.

In some embodiments of the present disclosure, the operation of the switch may be adjusted according to the pressure value between the point rail and the stock rail by using the PID control algorithm, to make the point rail being attached to the stock rail. In this way, it is possible to reduce the risk of derail of the train due to a failure of the switch or untight attachment between the point rail and the stock rail closely due to foreign objects, such as gravel, ice, or the like, existing between the point rail and the stock rail. Besides, the PID control algorithm is simple, having a good robustness, and high reliability, and thus it is suitable for the controlling of the operation of the switch.

REFERENCE NUMERALS OF MAIN COMPONENTS

| Pressure sensor | 1 | Signal processor | 2 |
| Strain gauge | 3 | First metal sheet | 4 |

| | | | |
|---|---|---|---|
| Spring | 5 | Second metal sheet | 6 |
| Metal box | 7 | Signal conditioning circuit board | 8 |
| Analog data collector | 9 | Control circuit board | 10 |
| Step-down converter | 11 | Beidou positioning circuit | 12 |
| GPRS communication circuit | 13 | | |

DETAILED DESCRIPTION

The present disclosure will be further described in detail below in conjunction with embodiments and the accompanying drawings.

Figure 1:
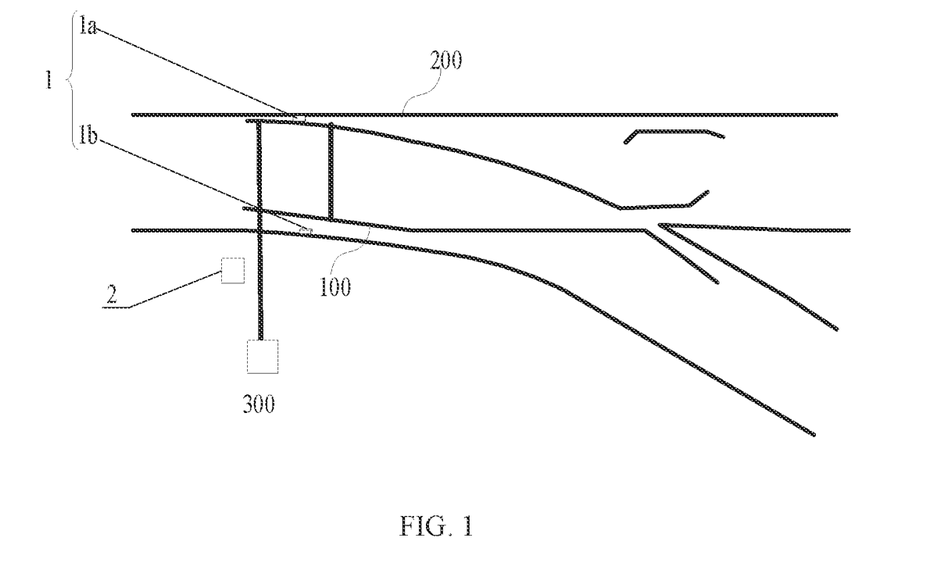
FIG. 1 is a schematic view illustrating an assembly of a pressure sensor and a signal processor for a method for detecting whether a point rail of a turnout is attached to a stock rail of the turnout according to some embodiments of the present disclosure.

In some embodiments of the present disclosure, a method for detecting whether a point rail 100 of a turnout is attached to a stock rail 200 of the turnout may be shown in FIG. 1. In some embodiments, a pair of stock rails 200 may be disposed at two opposite sides of the point rail 100. A pressure sensor 1 may be disposed on the stock rail 200 disposed at each side of the point rail 100. In some embodiments, a pair of pressure sensors 1 may be provided, and each pressure sensor 1 may disposed on a corresponding one of the stock rails 200. The pair of pressure sensors 1 may be distinguished as a first pressure sensor 1a and a second pressure sensor 1b. As shown in FIG. 1, each of the first pressure sensor 1a and the second pressure sensor 1b may be disposed at one side of the corresponding stock rail 200 that is adjacent to the point rail 100. Each of the first pressure sensor 1a and the second pressure sensor 1b may be configured to detect whether the point rail 100 is attached to the stock rail 200. More specifically, each of the first pressure sensor 1a and the second pressure sensor 1b may be configured to detect a pressure signal between the point rail 100 and the stock rail 200, and transmit the pressure signal to the signal processor 2. The signal processor 2 may be configured to convert the pressure signal between the point rail 100 and the corresponding one of the pair of stock rails 200 into a voltage signal for processing. The voltage signal may be processed by the signal processor 2, for example, may be converted into a detected pressure signal or value. After being processed by the signal processor 2, the processed information (that is, the detected pressure value) may be transmitted to a monitoring center of a relevant railway department. Besides, a corresponding host computer may be set at the PC (personal computer) side of the monitoring center, and a staff or a user may intuitively or visually check whether the point rail 100 is closely attached to the corresponding one of the pair of stock rails 200.

The first pressure sensor 1a and the second pressure sensor 1b may be disposed on the pair of stock rails 200 at a mounting position of the stock rails 200, and a distance between the mounting position of the stock rails 200 and an end of the point rail 100 may range from substantially 1.5 m to substantially 2.5 m. The first pressure sensor 1a and the second pressure sensor 1b may be disposed at two sides of the pair of stock rails 200 facing towards each other. That is, each of the first pressure sensor 1a and the second pressure sensor 1b may be disposed at one side of the corresponding stock rail 200 that is adjacent to the point rail 100. In some embodiments, the first pressure sensor 1a and the second pressure sensor 1b may be symmetrically arranged at two sides of the pair of stock rails facing towards each other, that is to say, each of first pressure sensor 1a and the second pressure sensor 1b may be disposed on the corresponding one of the pair of stock rails 200. The distance range between the mounting position of the stock rails 200 and an end of the point rail 100 will provide suitable mounting space for the pressure sensors 1, which is convenient for the mounting of the pressure sensors 1.

Figure 2:
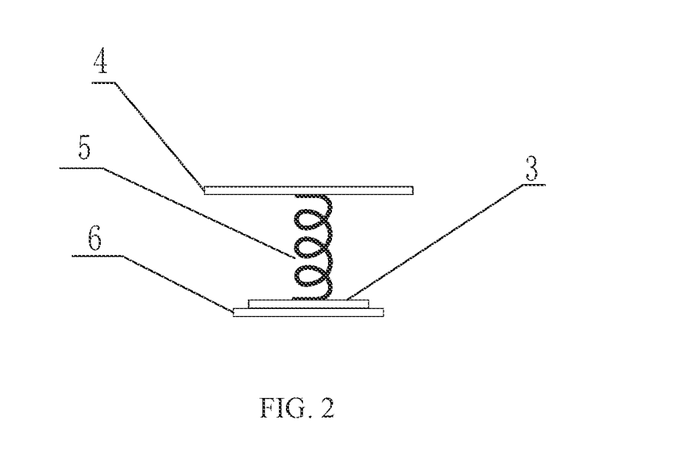
FIG. 2 is a schematic structural view of the first or second pressure sensor for the method for detecting whether the point rail of the turnout is attached to the stock rail of the turnout according to some embodiments of the present disclosure.

As shown in FIG. 2, each of first pressure sensor 1a and the second pressure sensor 1b may include a strain gauge 3, a first metal sheet 4, a spring 5, and a second metal sheet 6. The spring 5 may be disposed between the first metal sheet 4 and the second metal sheet 6. The strain gauge 3 may be disposed between the second metal sheet 6 and the spring 5. The second metal sheet 6 may be disposed on a bottom of the corresponding one of the pair of stock rails 200, that is, the second metal sheet 6 may be disposed on the corresponding one of the pair of stock rails 200 and contact with the corresponding one of the pair of stock rails 200. When a switch 300 drives the point rail 100 to approach or move toward the corresponding one of the pair of stock rails 200, the point rail 100 may apply a force or a pressure to the first metal sheet 4. The first metal sheet 4 may further transmit the force applied by the point rail 100 to the spring 5. The spring 5 may apply another force to the strain gauge 3, thereby causing a change in a resistance value of the strain gauge 3. The change in the resistance value of the strain gauge 3 may be converted into a change in the voltage value via the signal processor 2 and processed by the signal processor 2, and further sent to the host computer at the PC side for display. In some embodiments, the first metal sheet 4 and the second metal sheet 6 may all be made of aluminum. However, in other embodiments, the first metal sheet 4 and the second metal sheet 6 may be made of other materials, such as copper, nickel-chromium, or the like. The materials of the first and second metal sheets will not be limited in some embodiments of the present disclosure.

Figure 3:
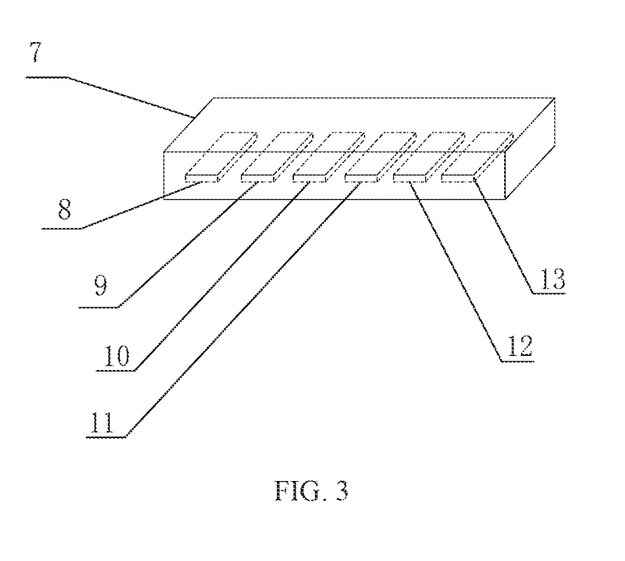
FIG. 3 is a schematic structural view of the signal processor for the method for detecting whether the point rail of the turnout is attached to the stock rail of the turnout according to some embodiments of the present disclosure.

As shown in FIG. 3, the signal processor 2 may include a metal box 7, a signal conditioning circuit board 8, an analog data collector 9, a control circuit board 10, a step-down converter 11, a Beidou positioning circuit 12, and a GPRS (General packet radio service) module 13. In some embodiments, the metal box 7 may be made of aluminum. However, in other embodiments, the metal box 7 may be made of other materials, such as copper, iron, or the like. The material of the metal box 7 will not be limited in some embodiments of the present disclosure. The signal conditioning circuit board 8, the analog data collector 9, the control circuit board 10, the step-down converter 11, the Beidou positioning circuit 12, and the GPRS communication circuit 13 may be arranged side by side in the metal box 7. The step-down converter 11 may be connected to the signal conditioning circuit board 8, the analog data collector 9, the control circuit board 10, the Beidou positioning circuit 12, and the GPRS communication circuit 13, and further configured to step down or lower down a power of the switch 300 and further supply the stepped-down power to the signal conditioning circuit board 8, the analog data collector 9, the control circuit board 10, the Beidou positioning circuit 12, and the GPRS communication circuit 13. The signal conditioning circuit board 8 may be configured to convert the resistance value of the strain gauge 3 into a voltage signal, and transmit the voltage signal to the analog data collector 9. The voltage signal may be further processed by the analog data collector 9 and converted into a digital signal. The digital signal may be further transmitted to the control circuit board 10 through a RS485 communication protocol. The control circuit board 10 may be further configured to convert the outputted voltage value (the voltage value indicated by the digital signal) into the corresponding pressure value (that is, the detected pressure value). In this way, the pressure between the point rail 100 and the corresponding one of the pair of stock rails 200 may be acquired. The Beidou positioning circuit 12 may be configured to send positioning information to the control circuit board 10. The control circuit board 10 may be further configured to control the GPRS communication circuit 13 to send the converted pressure and the positioning information of the switch 300 to the monitoring center of the relevant railway department. Thus, it is possible to check whether the point rail 100 is closely attached to the corresponding one of the pair of stock rails 200 via the host computer at the PC side of the monitoring center.

In some embodiments, the step-down converter 11 may step down the power of the switch 300 to 12V and 5V respectively. In some embodiments, the voltage of 12V may be supplied to the analog data collector 9 and the control circuit board 10. The voltage of 5V may be supplied to the signal conditioning circuit board 8, the Beidou positioning circuit 12, and the GPRS communication circuit 13.

The control circuit board 10 may be implemented by a minimum control board STM32F103ZET6.

The PC in the monitoring center may be configured to monitor the switch 300. Data exchange interfaces may be arranged between the host computer of the PC and a monitoring software of the switch 300. In this way, the monitoring software of the switch 300 may control the rotation of the switch 300 based on the pressure information in the host computer of the PC in the monitoring center. Thus, it is possible to ensure that the point rail 100 is attached to the corresponding one of the pair of stock rails 200.

Figure 4:
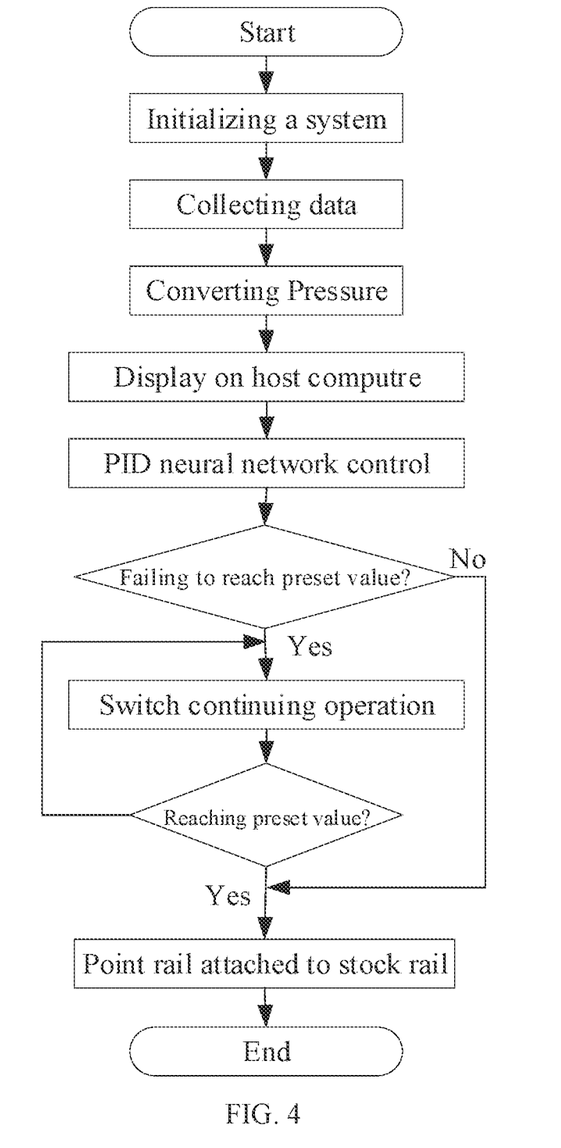
FIG. 4 is a flow chart of the method for detecting whether the point rail of the turnout is attached to the stock rail of the turnout according to some embodiments of the present disclosure.

As shown in FIG. 4, detection of whether the point rail 100 is attached to the corresponding one of the pair of stock rails 200 may be achieved by the following scheme. Firstly, the system may be initialized. When the switch 300 drives the point rail 100 to move towards or approach to the corresponding one of the pair of stock rails 200, the force applied to the strain gauge 3 by the point rail 100 may gradually increase, and the resistance value of the strain gauge 3 may be changed. The changed resistance value of the strain gauge 3 may be converted into the corresponding voltage value through the signal conditioning circuit board 8. The voltage value may be further converted into a digital value through the analog data collector 9. After that, the converted digital information or digital value may be sent to the control circuit board 10 through the RS485 communication protocol to realize data collection. Then the voltage value inputted into the control circuit board 10 may be converted to the corresponding detected pressure value by the control circuit board 10, and the converted detected pressure value may be transmitted to the host computer at the PC side of the monitoring center for display. The host computer at the PC side of the monitoring center may further calculate or determine a deviation between a preset pressure value between the point rail 100 and the corresponding one of the pair of stock rails 200 corresponding to a state in which the point rail 100 is attached to the corresponding one of the pair of stock rails 200 and the detected pressure value fed back by the strain gauge 3 by using the PID control algorithm. After that, the calculation result (that is, the calculated deviation) may be transmitted to the monitoring software of the switch 300. The monitoring software of the switch 300 may further control the PC to send a rotation command to the switch 300 according to the received or detected pressure value to drive the switch 300 to continue to rotate, until the pressure between the point rail 100 and the corresponding one of the pair of stock rails 200 fed back by the strain gauge 3 reaches the preset pressure value (that is, equal to the preset pressure value). At this time, the switch 300 may stop rotating, and it may be judged that the point rail 100 is closely attached to the corresponding one of the pair of stock rails 200.

Figure 5:
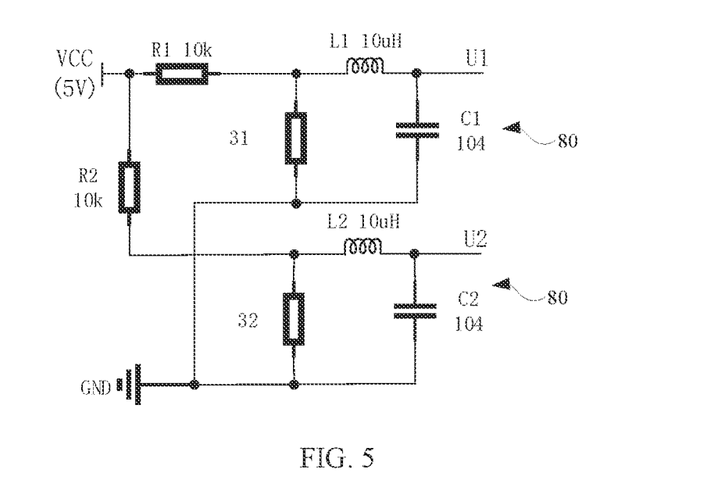
FIG. 5 is a schematic view of a signal conditioning circuit for the method for detecting whether the point rail of the turnout is attached to the stock rail of the turnout according to some embodiments of the present disclosure.

As shown in FIG. 5, a signal conditioning circuit 81 may be arranged on the signal conditioning circuit board 8. The signal conditioning circuit 81 may include a first resistor R1, a second resistor R2, a first capacitor C1, a second capacitor C2, a first inductor L1, and a second inductor L2. Since a pair of pressure sensors 1 (that is, the first pressure sensor 1a and the second pressure sensor 1b) are used for the same point rail 100, two identical sub-circuits 80 may be used to perform piezoelectric conversion on the two strain gauges (hereafter, the two stain gauges are distinguished as a first strain gauge 31 of the first pressure sensor 1a and a second strain gauge 32 of the second pressure sensor 1b, respectively) of the pair of pressure sensors 1. The first resistor R1 and the first strain gauge 31 may be connected in series between a VCC terminal and a GND terminal of the output terminal 5V of the step-down converter. The first strain gauge 31 and the first capacitor C1 may be connected in parallel between two ends of the first inductor L1 and the GND terminal of the output terminal 5V of the step-down converter. The second resistor R2 and the second strain gauge 32 may be connected in series between the VCC terminal and the GND terminal of the output terminal 5V of the step-down converter. The second strain gauge 32 and the second capacitor C2 may be connected in parallel between two ends of the second inductor L2 and the GND terminal of the output terminal 5V of the step-down converter. In this way, it is possible to change the voltage value supplied to the signal conditioning circuit board 8 by changing the resistance value of the first strain gauge 31 and the second strain gauge 32. The corresponding voltage value may be outputted after being filtered by an LC filter circuit. This voltage value corresponds to a changing amount of the resistance values of the strain gauges.

Figure 6:
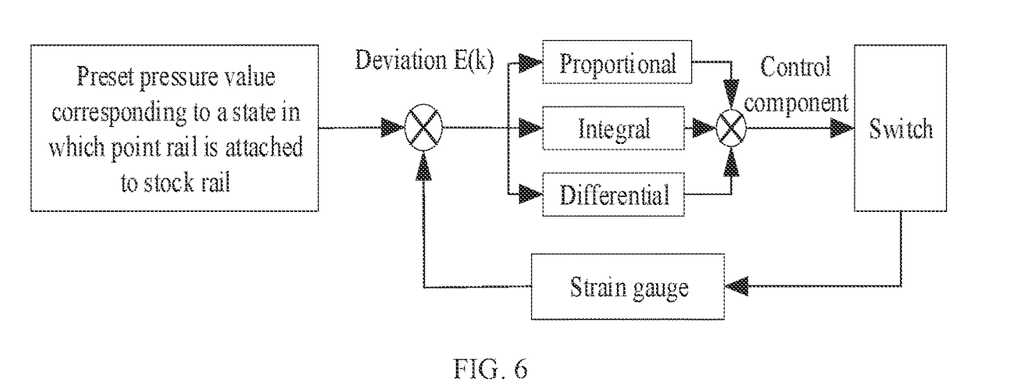
FIG. 6 is a block diagram illustrating a scheme for adjusting an operation of the switch by using a PD (Proportional Integral Derivative) control algorithm for the method for detecting whether the point rail of the turnout is attached to the stock rail of the turnout according to some embodiments of the present disclosure.

As shown in FIG. 6, adjusting an operation of the switch 300 by using the PID control algorithm may be achieved by the following scheme. Firstly, the preset pressure value corresponding to a state in which the point rail 100 is attached to the corresponding one of the pair of stock rails 200 may be preset in the host computer at the PC side of the monitoring center. Then the deviation between the detected pressure value fed back by the strain gauge 3 and the preset pressure value may be calculated. Furthermore, a control component may be formed or generated based on or by using the deviation through a linear combination of proportional, integral, and differential operations. The PC computer may further control the switch 300 according to or in response to the control component until the deviation reaches 0. At this time, the PC computer may judge or determine that the point rail 100 has already been attached to the corresponding one of the pair of stock rails 200. After that, the PC computer may control the switch 300 to stop operation. In this way, the control of the switch 300 may be completed.

The working principle and the working process according to some embodiments of the present disclosure may be descried as follows.

Figure 7:
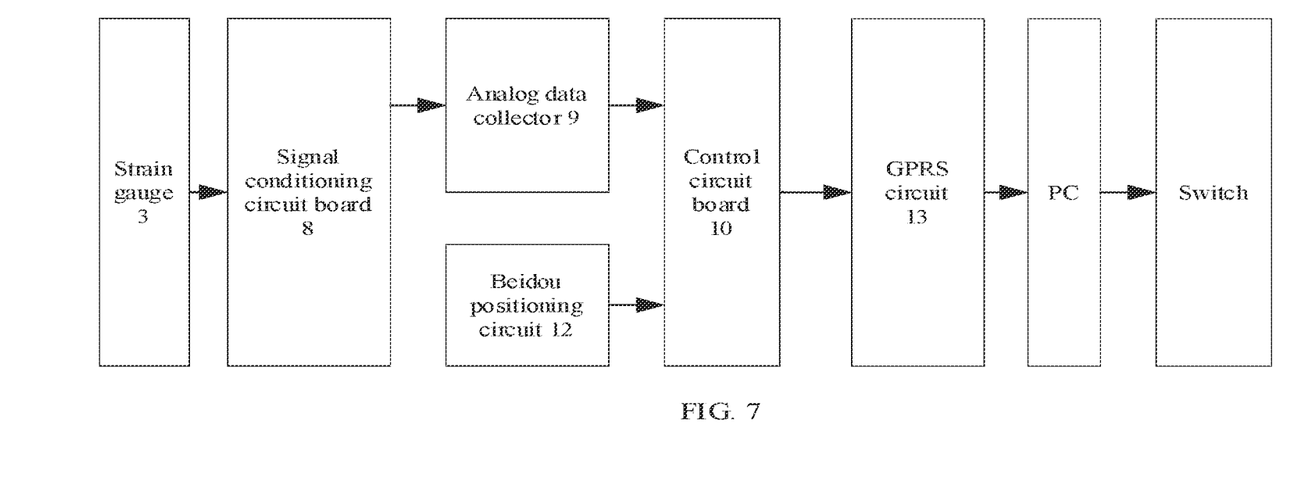
FIG. 7 illustrates a working principle of the method for detecting whether the point rail of the turnout is attached to the stock rail of the turnout according to some embodiments of the present disclosure.

As shown in FIG. 7, when the switch 300 drives the point rail 100 to move towards or approach to the corresponding one of the pair of stock rails 200, the force applied to the strain gauge 3 by the point rail 100 may gradually increase, and the resistance value of the strain gauge 3 may be changed. The changed resistance value of the strain gauge 3 may be converted into the corresponding voltage value through the signal conditioning circuit board 8. The voltage value may be further converted into a digital value through the analog data collector 9. After that, the converted digital information or digital value may be sent to the control circuit board 10 through the RS485 communication protocol to realize data collection. Then the voltage value inputted into the control circuit board 10 may be converted to the corresponding detected pressure value by the control circuit board 10, and the converted and detected pressure value may be transmitted to the host computer at the PC side of the monitoring center for display. The host computer at the PC side of the monitoring center may further calculate or determine a deviation between the preset pressure value between the point rail 100 and the corresponding one of the pair of stock rails 200 corresponding to the state in which the point rail 100 is attached to the corresponding one of the pair of stock rails 200 and the detected pressure value fed back by the strain gauge 3 by using the PID control algorithm. After that, the calculation result (that is, the calculated deviation) may be transmitted to the monitoring software of the switch 300. The monitoring software of the switch 300 may further control the PC to send a rotation command to the switch 300 according to the received and detected pressure value to drive the switch 300 to continue to rotate, until the pressure between the point rail 100 and the corresponding one of the pair of stock rails 200 fed back by the strain gauge 3 reaches the preset value (that is, equal to the preset value). At this time, the switch 300 may stop rotating, and it may be judged that the point rail 100 is closely attached to the corresponding one of the pair of stock rails 200.

What is claimed is:

1. A method for detecting whether a point rail of a turnout is attached to a stock rail of the turnout, the point rail corresponding to a pair of stock rails, and the pair of stock rails being disposed at two opposite side of the point rail, the method being performed by using a first pressure sensor and a second pressure sensor; the first pressure sensor and the second pressure sensor are identical to each other;

wherein each of the first pressure sensor and the second pressure sensor is disposed on a corresponding one of the pair of stock rails, and each of the first pressure sensor and the second pressure sensor is configured to detect whether the point rail is attached to the corresponding one of the pair of stock rails, convert a pressure signal between the point rail and the corresponding one of the pair of stock rails into a voltage signal, and transmit the voltage signal to a signal processor; the signal processor is configured to process the voltage signal to acquire a detected pressure value and transmit the detected pressure value to a monitoring center of a relevant railway department; wherein a host computer is set at a PC (personal computer) side of the monitoring center, and the host computer is configured for a user to visually check whether point rail is attached to the stock rail, and configured to control an operation of a switch in response to the detected pressure value collected by the first pressure sensor and the second pressure sensor by using a PID (Proportional Integral Derivative) control algorithm, such that the switch drives the point rail to be attached to the corresponding one of the pair of stock rails;

wherein each of the first pressure sensor and the second pressure sensor a spring, a first metal aluminum sheet, a second metal aluminum sheet, and a strain gauge; the spring is disposed between the first metal aluminum sheet and the second metal aluminum sheet, the strain gauge is disposed between the second metal aluminum sheet and the spring, and the second metal aluminum sheet is disposed at a bottom of each of the pair of stock rails; wherein when the switch drives the point rail to move toward the corresponding one of the pair of stock rails, the point rail applies a force to the first metal aluminum sheet, the first metal aluminum sheet transmits the force to the spring, and the spring applies another force to the strain gauge, causing a change in a resistance value of the strain gauge; the change in the resistance value of the strain gauge is converted into a change in a voltage value via the signal processor, processed by the signal processor, and further sent to the host computer at the PC side for display;

wherein the signal processor comprises a metal aluminum box, a signal conditioning circuit board, an analog data collector, a control circuit board, a step-down converter, a Beidou positioning circuit, and a GPRS (General packet radio service) module; the signal conditioning circuit board, the analog data collector, the control circuit board, the step-down converter, the Beidou positioning circuit, and the GPRS communication circuit are arranged side by side in the metal aluminum box; the step-down converter is configured to step down a power of the switch and further supplies the stepped-down power to the signal conditioning circuit board, the analog data collector, the control circuit board, the Beidou positioning circuit, and the GPRS communication circuit; the signal conditioning circuit board is configured to convert the resistance value of the strain gauge into a voltage signal and transmit the voltage signal to the analog data collector; the analog data collector is configured to convert the voltage signal into a digital signal, and the digital signal is further transmitted to the control circuit board through a RS485 communication protocol; the Beidou positioning circuit is configured to send positioning information to the control circuit board; the control circuit board is configured to convert the voltage value into the detected pressure value to acquire a pressure between the point rail and the corresponding one of the pair of stock rails and further control the GPRS communication circuit to send the detected pressure value and the positioning information of the switch to the monitoring center of the relevant railway department, and whether the point rail is attached to the stock rail is checked via the host computer at the PC side of the monitoring center;

wherein the method further comprises:

initializing a system;

driving, by the switch, the point rail to move towards the corresponding one of the pair of stock rails, such that the force applied to the strain gauge by the point rail gradually increases, and the resistance value of the strain gauge is changed;

converting, by the signal conditioning circuit board, the changed resistance value of the strain gauge into the voltage value;

converting, by the analog data collector, the voltage value into a digital value;

sending the converted digital value to the control circuit board through the RS485 communication protocol to realize data collection;

converting, by the control circuit board, the voltage value to the detected pressure value;

transmitting the detected pressure value to the host computer at the PC side of the monitoring center for display;

calculating, by the host computer at the PC side of the monitoring center, a deviation between a preset pressure value between the point rail and the stock rail corresponding to a state in which the point rail is attached to the stock rail and the detected pressure value fed back by the strain gauge by using the PID control algorithm;

transmitting the calculated deviation to the monitoring software of the switch;

controlling, by the monitoring software of the switch, the PC to send a rotation command to the switch according to the detected pressure value to drive the switch to continue to rotate, until the detected pressure value between the point rail and the stock rail reaches the preset pressure value; and in response to the detected pressure value between the point rail and the stock rail reaching the preset pressure value, the switch stopping rotating, and determining that the point rail is attached to the stock rail.

2. The method as claimed in claim 1, wherein the PC in the monitoring center is configured to monitor the switch, data exchange interfaces are arranged between the host computer of the PC and a monitoring software of the switch, and the monitoring software of the switch is configured to control the rotation of the switch based on the detected pressure value in the host computer of the PC in the monitoring center to drive the point rail to be attached to the stock rail.

3. The method as claimed in claim 1, wherein controlling the operation of the switch by using the PID control algorithm comprises:

presetting the preset pressure value corresponding to the state in which the point rail is attached to the stock rail in the host computer at the PC side of the monitoring center;

calculating the deviation between the detected pressure value fed back by the strain gauge and the preset pressure value;

generating a control component based on the deviation through a linear combination of proportional, integral, and differential operations;

controlling, by the PC, the switch in response to the control component until the deviation reaches 0;

determining that the point rail is attached to the stock rail in response to the deviation reaching 0; and controlling, by the PC, the switch to stop operation such that the control of the switch is completed.

4. The method as claimed in claim 1, wherein the step-down converter is configured to step down the power of the switch to 12V and 5V respectively; the voltage of 12V is supplied to the analog data collector and the control circuit board, and the voltage of 5V is supplied to the signal conditioning circuit board, the Beidou positioning circuit, and the GPRS communication circuit.

5. The method as claimed in claim 4, wherein a signal conditioning circuit is arranged on the signal conditioning circuit board; the signal conditioning circuit comprises a first resistor, a second resistor, a first capacitor, a second capacitor, a first inductor, and a second inductor;

the signal conditioning circuit comprises two sub-circuits to perform piezoelectric conversion on the strain gauge of the first pressure sensor and the strain gauge of the second pressure sensor;

the first resistor and the strain gauge of the first pressure sensor are connected in series between a VCC terminal and a GND terminal of the output terminal 5V of the step-down converter, and the strain gauge of the first pressure sensor and the first capacitor are connected in parallel between two ends of the first inductor and the GND terminal of the output terminal 5V of the step-down converter;

the second resistor and the strain gauge of the second pressure sensor are connected in series between the VCC terminal and the GND terminal of the output terminal 5V of the step-down converter, and the strain gauge of the second pressure sensor and the second capacitor are connected in parallel between two ends of the second inductor and the GND terminal of the output terminal 5V of the step-down converter;

the voltage value supplied to the signal conditioning circuit board is changed by changing the resistance value of the strain gauge of the second pressure sensor and the strain gauge of the second pressure sensor, the voltage value is outputted after being filtered by an LC filter circuit, and the outputted voltage value corresponds to a changing amount of the resistance values of the first strain gauge and the second strain gauge.

6. The method as claimed in claim 1, wherein the first pressure sensor and the second pressure sensor are disposed on the pair of stock rails at a mounting position of the stock rails, and a distance between the mounting position of the stock rails and an end of the point rail ranges from substantially 1.5 m to substantially 2.5 m;

the first pressure sensor and the second pressure sensor are symmetrically disposed at two sides of the pair of stock rails facing towards each other, and each of the first pressure sensor and the second pressure sensor are disposed on the corresponding one of the pair of stock rails.

* * * * *